(12) United States Patent
Liu

(10) Patent No.: US 7,860,899 B2
(45) Date of Patent: Dec. 28, 2010

(54) AUTOMATICALLY DETERMINING A DATABASE REPRESENTATION FOR AN ABSTRACT DATATYPE

(75) Inventor: Zhen Hua Liu, San Mateo, CA (US)

(73) Assignee: Oracle International Corporation, Redwood Shores, CA (US)

(*) Notice: Subject to any disclaimer, the term of this patent is extended or adjusted under 35 U.S.C. 154(b) by 364 days.

(21) Appl. No.: 11/728,650

(22) Filed: Mar. 26, 2007

(65) Prior Publication Data

US 2008/0243916 A1 Oct. 2, 2008

(51) Int. Cl.
*G06F 17/30* (2006.01)

(52) U.S. Cl. .................. 707/804; 707/756; 707/792; 707/793; 707/805; 715/234

(58) Field of Classification Search .................. None
See application file for complete search history.

(56) References Cited

U.S. PATENT DOCUMENTS

| | | | |
|---|---|---|---|
| 5,495,605 A | 2/1996 | Cadot | |
| 5,546,579 A | 8/1996 | Josten et al. | |
| 5,643,633 A | 7/1997 | Telford et al. | |
| 5,822,748 A | 10/1998 | Cohen et al. | |
| 5,870,590 A | 2/1999 | Kita et al. | |
| 5,924,088 A | 7/1999 | Jakobsson et al. | |
| 5,974,408 A | 10/1999 | Cohen et al. | |
| 6,026,394 A | 2/2000 | Tsuchida et al. | |
| 6,061,676 A | 5/2000 | Srivastava et al. | |
| 6,282,537 B1 | 8/2001 | Madnick et al. | |
| 6,298,342 B1 | 10/2001 | Graefe et al. | |
| 6,330,573 B1 | 12/2001 | Salisbury et al. | |
| 6,339,768 B1 | 1/2002 | Leung et al. | |
| 6,366,934 B1 * | 4/2002 | Cheng et al. | 715/210 |
| 6,370,524 B1 | 4/2002 | Witkowski | |
| 6,427,123 B1 | 7/2002 | Sedlar | |
| 6,510,422 B1 | 1/2003 | Galindo-Legaria et al. | |

(Continued)

OTHER PUBLICATIONS

Airi Lalminen et al, "Requirements for XML Document Database Systems", Dept of Comupter Science and Information Systems, University of Jwaskya, 2001, p. 85-94.*

(Continued)

*Primary Examiner*—Etienne P LeRoux
*Assistant Examiner*—Hung D Le
(74) *Attorney, Agent, or Firm*—Hickman Palermo Truong & Becker LLP

(57) ABSTRACT

A method and apparatus for determining a database representation for an abstract datatype that may have more than one database representation. A user supplies a logical description that references the abstract datatype, along with one or more sample queries that reference the abstract datatype. For example, the user supplies a DDL statement to create a table using that abstract datatype as a column, without specifying any database representation for the abstract datatype. Also the user supplies a set of queries that reference the abstract datatype columns. Based on the user information, a database representation for the abstract datatype is determined. A script file containing code to create one or more base structures for the abstract datatype and to create zero or more indexes for the base structures is generated. The script file may be commented to explain to the user why a particular base structure or index was included in the script file.

34 Claims, 4 Drawing Sheets

U.S. PATENT DOCUMENTS

| | | | |
|---|---|---|---|
| 6,519,597 | B1 | 2/2003 | Cheng et al. |
| 6,529,896 | B1 | 3/2003 | Leung et al. |
| 6,529,901 | B1 | 3/2003 | Chaudhuri et al. |
| 6,622,138 | B1 | 9/2003 | Bellamkonda et al. |
| 6,643,633 | B2 | 11/2003 | Chau et al. |
| 6,654,734 | B1 | 11/2003 | Mani et al. |
| 6,694,306 | B1 | 2/2004 | Nishizawa et al. |
| 6,697,805 | B1 | 2/2004 | Choquier et al. |
| 6,785,673 | B1 | 8/2004 | Fernandez et al. |
| 6,792,420 | B2 | 9/2004 | Chen et al. |
| 6,799,184 | B2* | 9/2004 | Bhatt et al. .............. 707/718 |
| 6,801,905 | B2 | 10/2004 | Andrei |
| 6,832,219 | B2* | 12/2004 | Lal .................... 1/1 |
| 6,915,304 | B2* | 7/2005 | Krupa ................ 707/756 |
| 6,925,470 | B1 | 8/2005 | Sangudi et al. |
| 6,934,699 | B1 | 8/2005 | Haas et al. |
| 7,024,425 | B2* | 4/2006 | Krishnaprasad et al. .......... 1/1 |
| 7,031,956 | B1 | 4/2006 | Lee et al. |
| 7,089,225 | B2 | 8/2006 | Li et al. |
| 7,139,746 | B2 | 11/2006 | Shin et al. |
| 7,146,360 | B2 | 12/2006 | Allen et al. |
| 7,162,485 | B2 | 1/2007 | Gottlob et al. |
| 7,171,404 | B2 | 1/2007 | Lindblad et al. |
| 7,171,407 | B2 | 1/2007 | Barton et al. |
| 7,216,127 | B2 | 5/2007 | Auerbach |
| 7,246,108 | B2 | 7/2007 | Ahmed |
| 7,315,852 | B2 | 1/2008 | Balmin et al. |
| 7,398,265 | B2 | 7/2008 | Thusoo et al. |
| 2001/0047372 | A1 | 11/2001 | Gorelik et al. |
| 2001/0049675 | A1 | 12/2001 | Mandler et al. |
| 2002/0073019 | A1 | 6/2002 | Deaton |
| 2002/0078068 | A1 | 6/2002 | Krishnaprasad et al. |
| 2002/0116457 | A1 | 8/2002 | Eshleman et al. |
| 2002/0143727 | A1 | 10/2002 | Hu et al. |
| 2002/0152267 | A1 | 10/2002 | Lennon |
| 2002/0188613 | A1 | 12/2002 | Chakraborty et al. |
| 2003/0055814 | A1 | 3/2003 | Chen et al. |
| 2003/0101169 | A1 | 5/2003 | Bhatt et al. |
| 2003/0131051 | A1 | 7/2003 | Lection et al. |
| 2003/0140308 | A1* | 7/2003 | Murthy et al. ............. 715/500 |
| 2003/0177341 | A1 | 9/2003 | Devillers |
| 2003/0200214 | A1 | 10/2003 | Doole et al. |
| 2003/0212664 | A1 | 11/2003 | Breining et al. |
| 2004/0010752 | A1 | 1/2004 | Chan et al. |
| 2004/0015783 | A1 | 1/2004 | Lennon et al. |
| 2004/0034615 | A1 | 2/2004 | Thomson et al. |
| 2004/0044659 | A1 | 3/2004 | Judd et al. |
| 2004/0044965 | A1 | 3/2004 | Toyama et al. |
| 2004/0148278 | A1 | 7/2004 | Milo et al. |
| 2004/0163041 | A1 | 8/2004 | Engel |
| 2004/0167864 | A1 | 8/2004 | Wang et al. |
| 2004/0199905 | A1 | 10/2004 | Fagin et al. |
| 2004/0205551 | A1 | 10/2004 | Santos |
| 2004/0216030 | A1 | 10/2004 | Hellman et al. |
| 2004/0220911 | A1 | 11/2004 | Zuzarte et al. |
| 2004/0225724 | A1 | 11/2004 | Pavlik et al. |
| 2004/0267760 | A1 | 12/2004 | Brundage et al. |
| 2005/0010896 | A1* | 1/2005 | Meliksetian et al. ........ 717/106 |
| 2005/0033730 | A1 | 2/2005 | Chaudhuri et al. |
| 2005/0038688 | A1 | 2/2005 | Collins et al. |
| 2005/0050016 | A1 | 3/2005 | Stanoi et al. |
| 2005/0055355 | A1 | 3/2005 | Murthy et al. |
| 2005/0091188 | A1 | 4/2005 | Pal et al. |
| 2005/0120031 | A1 | 6/2005 | Ishii |
| 2005/0187917 | A1 | 8/2005 | Lawande et al. |
| 2005/0228792 | A1 | 10/2005 | Chandrasekaran et al. |
| 2005/0229158 | A1 | 10/2005 | Thusoo et al. |
| 2005/0246159 | A1 | 11/2005 | Perla et al. |
| 2005/0257201 | A1 | 11/2005 | Rose et al. |
| 2005/0262491 | A1 | 11/2005 | Gu |
| 2005/0273772 | A1 | 12/2005 | Matsakis et al. |
| 2005/0289125 | A1 | 12/2005 | Liu et al. |
| 2006/0085451 | A1 | 4/2006 | Pal et al. |
| 2006/0212420 | A1 | 9/2006 | Murthy |
| 2006/0242563 | A1 | 10/2006 | Liu et al. |
| 2007/0027880 | A1 | 2/2007 | Dettinger et al. |
| 2007/0038649 | A1* | 2/2007 | Agrawal et al. ............. 707/100 |
| 2007/0073643 | A1 | 3/2007 | Ghosh et al. |
| 2008/0189302 | A1* | 8/2008 | Evani ........................ 707/100 |

OTHER PUBLICATIONS

Philip Bohannon et al, "From XML Schema to Relations: A Cost-Based Approach to XML Storage", Bell Laboratories, Proc of the 18th International Conference on Data Engineering, IEEE, 2002.*

Crestana et al, "Consistent Schema Version Removal: An Optimization Technique for Object-Oriented View", 2000.*

R. Bourret et al, "A Generic Load/Extract Utility for Data Transfer Between XML Documents and Relational Databases", Department of Computer Science, Darmstadt, Germany, 2000.*

Kanne et al, "Efficient storage of XML data", In Proceedings of the 16th International Conference on Data Engineering, 2000.*

European Patent Office, "Communication Pursuant to Article 94(3) EPC", Application No. 05 760 442.3—2201, dated Jun. 20, 2008, 2 pages.

Claims, Application No. 05 760 442.3—2201, 8 pages.

Girardot et al., "Millau: an encoding format for efficient representation and exchange of XMLover the Web", IBM Almaden Research Center, 24 pages.

Shankar Pal et al., "Indexing XML Data Stored in a Relational Database", Proceedings of the 30th VLDB Conference, 2004, 12 pages.

Mackenzie et al., "Finding Files", FindUtils, Version 4.1.2, Source Code, GNU.org, Nov. 1997, source files, code. C, 22 pages.

Cormen et al., "Introduction to Algorithms", MIT Press, 2001, 2nd Edition, 4 pages.

European Patent Office, "Communication pursuant to Article 94 (3) EPC", European patent application 05732473.3-1225, dated Feb. 4, 2008, 7 pages.

State Intellectual Property Office of P.R.C., "Notification of the First Office Action", European patent application 2005800186273.9, dated Oct. 12, 2007, 9 pages.

Claims, European patent application 2005800186273.9, 3 pages.

Claims, European patent application 05732473.3-1225, 3 pages.

Deutsch, Alin et al., "Minimization and Group-By Detection for Nested XQueries", University of California, San Diego, 2003, 15 pages.

Dehaan, David, "A Rewriting Algorithm for Multi-Block Aggregation Queries and Views using Prerequisites and Compensations", University of Waterloo, Canada, Technical Report CS-2004-25, May 3, 2004, 39 pages.

Chaudhuri, Surajit, "An Overview of Query Optimization in Relational Systems", Microsoft Research, 1998, 10 pages.

Muralikrishna, M., "Improved Unnesting Algorithms for Join Aggregate SQL Queries", VLDB Conference, Canada, 1992, 12 pages.

Hayu, John, "Analytic SQL Features in Oracle9i", An Oracle Technical White Paper, Dec. 2001, 32 pages.

Oracle, "Optimizer Modes, Plans Stability, and Hints", Oracle8i Tuning Release 8.1.5 A67775-01, Oracle Website, 1999, 54 pages.

Sushant, J. et al., "Translating XSLT Programs to Efficient SQL Queries", Int'l WWW Conf., Proceedings of the 11th Int'l Conf. on WWW, Session: Query Language for Semantic Web, Published 2002, pp. 616-626.

Fokoue, A. et al., "Compiling XSLT 2.0 into XQuery 1.0", Int'l WWW Conf., Proceedings of the 14th Int'l Conf. on WWW, Published: 2005, pp. 682-691.

WC3, "XML Schema Part 1: Structures, Second Edition", http://www.w3.org/TR/2004/REC-xmlschema-1-20041028/structures.htm#intro-purpose downloaded from the Internet Jul. 15, 2009 (210 pages).

Simeon, J. et al., "The Essence of XML", Annual Symposium on Principles of Programming Languages, Proceedings of the 30th ACM SIGPLAN-SIGACT Symposium on Principles of Programming Languages, Published: 2003; pp. 1-13.

Lee, D. et al., "CPI: Constraints-Preserving Inlining Algorithms for Mapping XML DTD to Relational Schema", Data & Knowledge Engineering, vol. 39, Issue 1, Published: Oct. 2001, pp. 3-25.

Shanmugasundaram, J. et al., "Relational Databases for Querying XML Documents: Limitations and Opportunities", Proceedings of the 25$^{th}$ VLDB Conf., Published: 1999, pp. 302-314.

Liu, J. et al., "Query Translation from XSLT to SQL", Database Engineering and Applications Symposium 2003, Published: Jul. 16-18, 2003, pp. 87-96.

Jones, N.D. et al., "Partial Evaluation and Automatic Program Generation", Prentice Hall Int'l, Jun. 1993 (425 pages).

U.S. Appl. No. 11/394,878, filed Mar. 31, 2006, Notice of Allowance, Correspondence Mailing Date: Aug. 20, 2009, 14 pgs.

U.S. Appl. No. 11/601,146, filed Nov. 17, 2006, Non-Final Office Action, Correspondence Mailing Date: Jul. 22, 2009, 17 pgs.

Jones, D., "Translating C to ADA", Knowledge Software Ltd. (1995) pp. 1-9.

Kennedy, K. et al., "Applications of a Graph Grammar for Program Control Flow Analysis", Dept. of Mathematical Sciences, Rice University, pp. 72-85.

Sklansky, J. et al., "A Formalism for Program Translation", Journal of the Association for Computing Machinery, vol. 15 (1968) 11 pages.

Van Den Bosch, P., "The translation of programming languages through the time of a graph transformation language" Department of Computer Science, The University of British Columbia, pp. 83-92.

W3C, XSL Transformations (XSLT) Version 1.0, Recommendation, Nov. 16, 1999, Ch. 1, 5.8, 6, 7.1.2, 7.1.3, 7.3, 7.4, 7.2, 9.2, 5.6, 10, 11.4, 11.5 (77 pages).

* cited by examiner

US 7,860,899 B2

AUTOMATICALLY DETERMINING A DATABASE REPRESENTATION FOR AN ABSTRACT DATATYPE

RELATED APPLICATIONS

This Application is related to the following U.S. patent applications.

U.S. patent application Ser. No. 10/884,311, entitled "Index for Accessing XML data", filed on Jul. 2, 2004, by Chandrasekaran et al. ("the XML Index Application");

U.S. patent application Ser. No. 11/601,146, entitled "Techniques of Efficient XML Query Using Combination of XML Table Index And Path/Value Index," filed by Liu et al. on Nov. 17, 2006 ("the XML Table Index Application");

U.S. patent application Ser. No. 10/428,878, entitled "Techniques For Rewriting XML Queries Directed To Relational Database Constructs," filed by Anand Manikutty, et al. on May 1, 2003, ("the Rewrite Application");

U.S. patent application Ser. No. 10/948,523, entitled "Efficient Evaluation Of Queries Using Translation" filed by Liu et al. on Sep. 22, 2004, ("the XQuery Rewrite Application");

U.S. patent application Ser. No. 10/874,400, entitled "Multi-tier Query Processing", filed by Rafi Ahmed on Jun. 22, 2004;

U.S. patent application Ser. No. 10/901,272, entitled "Reusing Optimized Query Blocks In Query Processing", filed by Rafi Ahmed on Jul. 27, 2004; and U.S. patent application Ser. No. 10/920,973, entitled "Selecting Candidate Queries", filed by Rafi Ahmed on Aug. 17, 2004;

The contents of all said U.S. patent applications are herein incorporated by reference for all purposes as if originally set forth herein.

FIELD OF THE INVENTION

The present invention relates to database systems. In particular, embodiments of the present invention relate to automatically determining a database representation for a data structure that can be stored in a database in more than one database representation.

BACKGROUND

Some database systems support multiple database representations for an abstract datatype. An abstract datatype is a datatype recognized and defined by a database system and having one or more physical representations within the database system by one or more other datatypes recognized by the database system. As used herein, the term "database representation" refers to the combination of any base structures that are used to store data for the abstract datatype and any indexes on the base structures. For purposes of illustration, an XML (extensible Markup Language) datatype will be used as an example of an abstract datatype for which a database system supports multiple database representations.

Different examples of base structures that a database might support for XML include, but are not limited to, object relational storage (O-R), LOB (Large Object), CLOB (Character LOB), BLOB (Binary LOB), CSX, and binary. In addition, a database might support a hybrid base structure in which a structured part of the XML is stored object relationally and an un-structured part of the XML is stored in CLOB or CSX form. Continuing with the XML example, the database system might support different indexing options for XML. Examples of different indexing options include, but are not limited to, a B+ tree, a bitmap index, an XML Index and an XML Table Index. An XML Index and an XML Table Index are discussed in the XML Index Application and the XML Table Index Application.

Thus, some database systems support multiple database representations for an abstract datatype. Clearly, some database representations are better than others for certain use cases. Moreover, some indexes are only appropriate for certain base structures. However, determining a suitable database representation can be difficult, as many factors affect the decision. For example, when XML is stored object relationally, the XML may be decomposed into a set of object relational tables such that a B+ tree index or bitmap index can be created to speed up user queries. However, when XML is stored in CLOB or CSX form, both XMLIndex and XMLTableIndex can be created to speed up the query.

Furthermore, as XML covers a wide spectrum of data, from both structured data to semi-structured to un-structured data, the selection of an appropriate database representation is tedious and error prone. For example, a user might analyze XQuery and/or SQL/XML statements manually, and then decide on a base structure and index type. The user then performance tunes the XQuery and/or SQL/XML statements.

Clearly, this trial and error approach is not a scalable solution. Furthermore, when an inappropriate base structure or index choice is made, query performance suffers drastically.

Therefore, improved techniques are desired for determining a database representation for an abstract datatype that can be stored in more than one database representation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A method and apparatus for determining a database representation for an abstract datatype that may have more than one database representation are disclosed herein. In one embodiment, a user supplies a logical description that references an abstract datatype, along with one or more sample queries that reference the abstract datatype. For example, the user supplies a DDL statement that could be used to create an XML datatype, without specifying any database representation for the XML datatype. The user also supplies one or more sample queries, such as an XQuery and/or an SQL/XML. Based on the user supplied information, a database representation for the abstract datatype is automatically determined.

In one embodiment, a script file for creating the database representation is generated. The script file contains code to create one or more base structures for the abstract datatype in one embodiment. The script file contains code to create one or more indexes for the aforementioned base structures, in one embodiment. The script file is commented to explain to the user why a particular base structure or index was included in the database representation, in one embodiment. The comments can help the user to decide whether or not to run the script to create the database representation for the data structure. If the user decides to not run the script, the user can provide a different logical description and/or a different set of sample queries and request that a new database representation be determined.

The database representation is determined based on a cost analysis, in one embodiment. Different database representations that the database system supports for the abstract datatype are determined. For example, different combinations of base structures and indexes are determined. Then, the sample queries are re-written based on the different database representations. Next, a cost analysis of the re-written sample queries is performed. The determination of the database representation is then based on the cost analysis.

Architecture Overview

Figure 1:
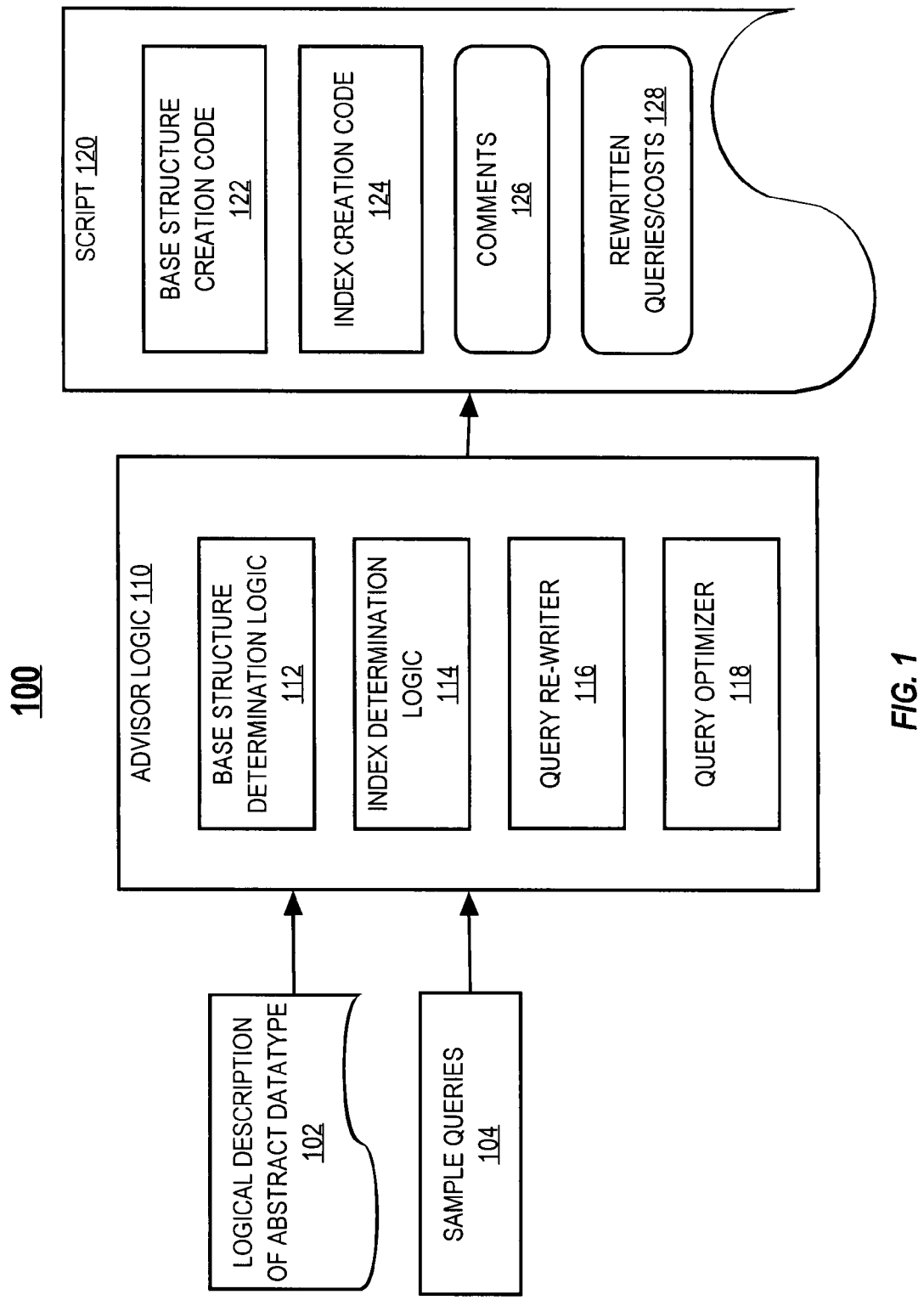
FIG. 1 is a diagram of an architecture for determining a database representation for an abstract datatype, in accordance with an embodiment of the present invention.

FIG. 1 depicts an overview of an architecture 100 for automatically determining a database representation for an abstract datatype that could be stored in a database system in more than one representation, in accordance with an embodiment of the present invention. The advisor logic 110 has database representation determination logic 112, which automatically determines one or more base structures for the abstract datatype based on the logical description 102 and the sample queries 104, in accordance with an embodiment of the present invention. The advisor logic 110 has index determination logic 114, which automatically determines suitable indexes for the base structures based on the logical description 102 and the sample queries 104, in accordance with an embodiment of the present invention. In one embodiment, the advisor logic 110 is implemented as software instructions, which execute on a computer system such as example computer system 400 of FIG. 4. However, the advisor logic 110 itself could be implemented by any combination of hardware and software.

As an example, the logical description 102 might include a DDL (Data Description Language) create table statement, which does not specify the type of base structure, as the type of base structure is to be determined by the advisor logic 110.

As a particular example, the following example DDL statement might be included in the logical description 102.

Example 1

Create Table purchaseOrder of XMLType

The logical description 102 might also include a schema for the data structure, as in Example 2, although the schema is not required. These examples are discussed in more detail below.

Example 2

Create Table purchaseOrder of XMLType Schema
'http://www.example.com/purchaseOrder.xsd'

As an example, the sample queries 104 could be compliant with one of any number of alternative Data Manipulation Languages (DML). DMLs are used to retrieve, insert, delete and update data in a database. An example of a DML is the Structured Query Language (SQL). As another example, the sample queries 104 could be compliant with an XML Query Language (XQuery). XQuery 1.0 is described in XQuery 1.0: An XML Query Language, W3C Recommendation 23 Jan. 2007, which is incorporated herein by reference. Alternatively, the sample queries 104 could be compliant with SQL/XML, which is an XML extension to SQL.

As discussed in more detail below, to determine a suitable database representation the advisor logic 110 makes use of a query re-writer 116 and a query optimizer 118, in one embodiment. The query re-writer 116 and query optimizer 118 may be separate software modules from the advisor logic 110, and may run on a separate computer system from the advisor logic 110.

The advisor logic 110 outputs a script file 120 that includes base structure creation (BSC) code 122 and index creation (IC) code 124, in one embodiment. The IC code 124 is not required. For example, the advisor logic 110 might determine that an index is not needed. As an example, the BSC code 122 may be a DDL (Data Description Language) create table statement. As an example, the IC code 124 may be a create index DDL statement. As a particular example, SQL has statements that define the structure of a database, including rows, columns, tables, and indexes. However, the BSC code 122 and the IC code 124 are not limited to SQL statements.

The script 120 contains re-written versions of the sample queries and costs associated with the re-written queries 128, in one embodiment. The script 120 may be commented 126 to inform the user as to why the advisor logic 110 selected a particular base structure and index.

Process Overview in Accordance with an Embodiment

Figure 2:
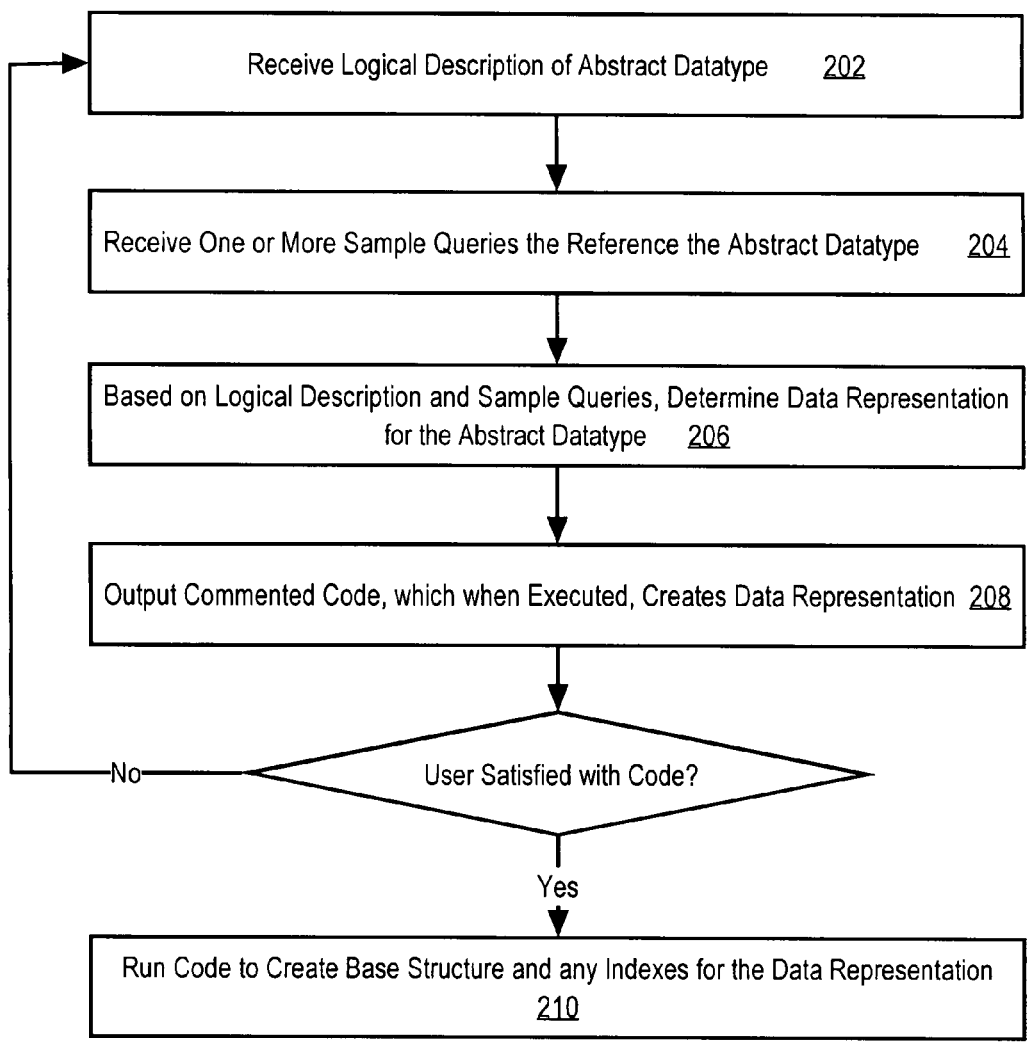
FIG. 2 is a flowchart illustrating a procedure for advising a user as to a database representation for an abstract datatype, in accordance with an embodiment of the present invention.

FIG. 2 is a flowchart illustrating a procedure 200 for automatically determining and advising regarding a database representation for an abstract datatype that could be represented in a database in more than one way, in accordance with an embodiment of the present invention. Procedure 200 uses an example in which an XML datatype is the abstract datatype. However, procedure 200 is not limited to XML. Procedure 200 will be discussed with reference to architecture 100 of FIG. 1, although procedure 200 is not so limited. In step 202, the advisor logic 110 inputs a logical description 102 of the data structure. In step 204, the advisor logic 110 inputs one or more sample queries 104 that reference the abstract datatype.

In step 206, the advisor logic 110 automatically determines a database representation for the abstract datatype, based on the logical description 102 and the sample queries 104. In one embodiment, the query re-writer 116 re-writes at least some of the sample queries 104 based on a candidate database representation. For example, the candidate database representation might be that an O-R storage structure will be used with a B+ index. Then, the query optimizer 118 is used to determine a cost of the queries that were re-written for that database representation. Then, the sample queries 104 are re-written for another database representation and the query optimizer 118 determines a cost of these re-written queries. Some of the sample queries 104 might not be re-written for a particular database representation. In this case, an infinitely large cost can assigned to these sample queries 104 for the particular database representation. Based on an analysis of the cost of all of the re-written queries, the database representation determination logic 102 determines a database representation.

In step 208, the advisor logic 110 outputs a commented script 120 that is capable of creating a database representation for the data structure. The script 120 contains code that when executed creates one or more base structures for the abstract datatype. For example, base structure creation code 122 might create an object relational table or column for the abstract datatype. Alternatively, the base structure creation code 122 might create a table in which the abstract datatype is represented in CLOB storage.

If the advisor logic 110 determined one or more indexes should be used, then the script 120 has code that is capable of creating the indexes. For example, index creation code 124 might be capable of creating a B+ index, an XMLtableIndex, an XMLIndex, etc.

The script 120 is commented to explain to the user why the advisor logic 110 selected the particular database representation. The user may wish to change the sample queries 104 or logical description 102 and allow the advisor logic 110 to make another determination of a suitable database representation. If so, the user provides such additional information and requests that a new determination be made, wherein control passes to step 202.

If the user is satisfied with the commented script 120, then the script 120 is run to create the base structure and indexes, if any, in step 210.

Note that the advisor logic 110 might determine that more than one database representation is suitable. For example, the advisor logic 110 might determine that a first database representation is best for one sample query, whereas a second database representation is best for a second sample query.

Example XML Base Structures

As previously discussed, a database representation includes one or more base structure and may also include an index on the base structure(s). For purposes of illustration, this section discussed base structures for XML abstract datatype, and the next section discusses indexes for XML. However, the present invention is not limited to XML. Various types of base structures may be used to store an XML document. One type of base structure stores an XML document as a text file in a file system.

Another type of base structure uses object-relational database systems that have been enhanced to store and process queries for XMLType instances. Determining the base structure for a given XML data structure may involve, for example, determining the columns, database objects, collection types, and constraints that are to be used by the database system to store data for XML data structure. If an XML schema is provided by the user, then determining the base structure may include additional steps such as (1) determining a base structure for the XML schema and (2) mapping information that maps the XML schema to components of the base structure.

However, the base structure does not have to be O-R. A base structure of an entire XML document may be some form of a LOB datatype. For example, an XML document may be stored in unstructured storage, such as a CLOB or a BLOB, or one or more tables whose columns store the components of an XML document in one or more rows.

A base structure may be a hierarchy of objects in an object-relational database; each object is an instance of an object class and stores one or more elements of an XML document. The object class defines, for example, the structure corresponding to an element, and includes references or pointers to objects representing the immediate descendants of the element.

Example XML Indexes

A) XML Index

The XML Index application describes various embodiments of an index that may be used to efficiently access XML documents managed by a relational database server, based on XPath queries. Such an index shall be referred to herein as an XML index.

An XML index as described in the XML Index application may be used to process XPath queries regardless of the format and data structures used to store the actual XML data (the "base structures"). In one embodiment, an XML index is a logical index that results from the cooperative use of a path index, a value index, and an order index. The path index provides a mechanism to lookup nodes based on simple (navigational) path expressions. The value index provides the lookup based on value equality or range. The order index associates hierarchical ordering information with indexed nodes. The order index is used to determine parent-child, ancestor-descendant and sibling relationships between XML nodes.

According to one embodiment, the logical XML index comprises a PATH table, which is a relational table that stores one row for each XML node in an XML document. For each indexed node, the PATH table row for the node contains various pieces of information associated with the node.

When the user submits a query involving XPaths (as predicate or fragment identifier), the XPath statement is decomposed into an SQL query that accesses the XML index table(s). The generated query typically performs a set of path, value and order-constrained lookups and merges their results appropriately.

B) XML Table Index

An XML Table Index is a table, separate from both the base structures storing the collection of XML documents and the XML Path Index table. Like the XML Path Index table, the XML Table Index also logically indexes the collection of XML documents, albeit in a different way. The XML Table Index table includes a plurality of columns that corresponds to a plurality of nodes in the XML documents. Node values associated with the plurality of nodes for a given documents are stored in the plurality of columns in each row of the XML Table Index that is associated with the given document (note that one or more rows may be associated with the given document). Preferably, columns in the table of XML Table Index are ones commonly associated with XPath-based expressions (e.g., a predicate) specified in queries. Further details of an XML Table Index are described in the XML Table Index Application.

Re-Writing Queries

As previously discussed, the advisor logic 110 re-writes the sample queries 104 prior to determining a cost associated with each query. Such code may include code that conforms to XML query languages, such as XQuery/XPath. XML Query Language ("XQuery") and XML Path Language ("XPath"), which are important standard query languages for XML, and which can be used in conjunction with SQL to express a large variety of useful queries. XPath 1.0 is described in XML Path Language (XPath), version 1.0, W3C Recommendation 16 Nov. 1999, which is incorporated herein by reference. XPath 2.0 is described in XML Path Language (Xpath) 2.0, W3C Recommendation 23 Jan. 2007, which is incorporated herein by reference.

Various approaches have been developed for a database system to execute XQuery/XPath queries. One approach for executing XQuery/XPath queries is referred to herein as the "rewrite" approach, or as query rewriting. XQuery/XPath queries received by a database system are dynamically rewritten to directly reference and access the underlying data. Specific techniques for implementing the rewrite approach are described in the Rewrite Application.

Query Optimizer

The advisor logic 110 that determines the database representation for the data structure employs a query optimizer 118 to determine a cost of queries, in one embodiment. There are numerous methods for estimating the cost of a query.

Determining a Database Representation in Accordance with an Embodiment

Figure 3:
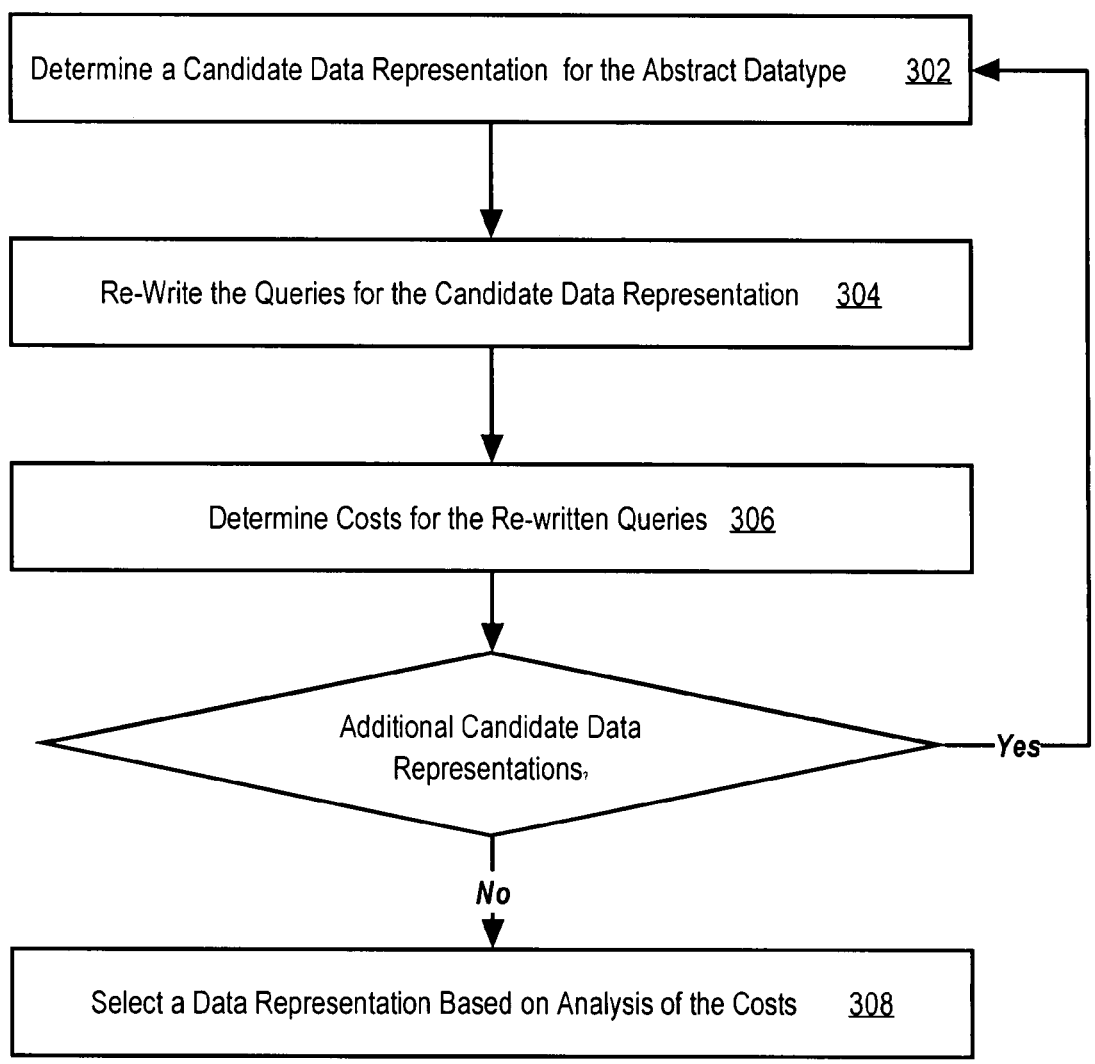
FIG. 3 is a flowchart illustrating a procedure for determining a database representation for an abstract datatype, in accordance with an embodiment of the present invention.

FIG. 3 is a flowchart illustrating a procedure 300 for determining a database representation for a data structure, in accordance with an embodiment. In step 302, a candidate database representation is determined. As previously discussed, the candidate database representation can include a base structure and an index on the base structure. Thus, one candidate database representation could be an object relational table with no indexes. Another could be the same object relational table with an index on a column of the table. The determination of what index to use and what to index can be made, for example, by examining query predicates.

In step 304, the advisor logic 110 provides the sample queries 104 to the query re-writer 116 to re-write the sample queries 104 for the candidate database representation. Some sample queries 104 may not be re-writable for a particular database representation.

In step 306, the advisor logic 110 determines costs for the re-written queries for this candidate database representation. In one embodiment, a query optimizer 118 is used to determine a query cost. As an example, a cost for each individual re-written query is determined. Then, a total cost for this candidate database representation is determined, based on the individual costs. In one embodiment, the total cost is the sum of the individual cost.

It might be that one query is best suited for object relational storage, whereas another query is best suited for CLOB storage. In one embodiment, the user is allowed to assign a weight to each sample query 104 such that more heavily weighted queries 104 have a greater impact on the total cost. The user might assign the weight based on how frequently each sample query 104 is expected to be run, or another factor. When determining the total cost, the advisor logic 110 weights each individual cost to determine a weighted total cost, in one embodiment.

For the sample queries 104 that are not re-writeable for a candidate data representation, the advisor logic 110 does not call the query optimizer 118 to determine a cost, in one embodiment. The advisor logic 110 assigns an infinitely large cost, such as infinity, to these sample queries 104 that are not re-writable, in one embodiment.

If there are additional candidate database representations to be considered, then control returns to step 302. Otherwise, control passes to step 308, wherein the advisor logic 110 selects one or more of the candidate database representations based on analysis of the costs. Note that the advisor logic 110 could determine that object relational storage is best for one query, whereas CLOB storage is best suited for another query. This can be reported to the user, such that the user might create two tables. For example, an object relational table might be used for day-to-day business queries, whereas CLOB storage might be used for reporting type queries. As a further example, the advisor logic 110 might determine and report that multiple different types of indexes might be suitable for the same data.

Examples of Input to Advisor and Script Output

For purposes of illustration, the following are two examples of a logical description of a data structure 102, sample queries 104, and a script 120 that the advisor logic 110 generates.

Example A

In example A, the user has specified an XML schema associated with the XMLType. Further, the user-supplied XPath query is rewritable by object relational storage. The advisor logic 110 includes BSC code 122 in the script 120 for creating a table to store the XML object relationally and IC code 124 to create a B+tree index on the object relational base tables.

The user specifies the following SQL scripts:

Schema registration:

Dbms_registerXMLSchema('http://www.example.com/purchaseOrder.xsd', xmlfile(purchaseOrder.xsd));

DDL to create XMLType table without any storage specification:

Create table purchaseOrder of XMLType schema 'http://www.example.com/purchaseOrder.xsd';

Sample Queries:

```
Select extract(value(po), '/purchaseOrder/lineItems', 'xmlns="
http://www.example.com/purchaseOrder.xsd"')
From purchaseOrder po
Where existsNode(value(po), '/purchaseOrder/lineItems[lineItem/price > 3
and ineItemQuantity > 4]',
'xmlns="http://www.example.com/purchaseOrder.xsd"') =1;
    Select v.*
From purchaseOrder po,
MLTable('$x/purchaseOrder/lineItems/lineItem' passing alue(po) as "x"
        Columns
                itemName varchar2(30) path 'itemName',
                Price number path 'price',
                Quantity number path 'quantity'
        ) v
;
```

The advisor logic 110 creates the following SQL DDL scripts:
(Dbms_registerXMLSchema('http://www.example.com/purchaseOrder.xsd', xmlfile('purchaseOrder.xsd'));
DDL to create XMLType table with storage specification:

Create table purchaseOrder of XMLType schema 'http://www.example.com/purchaseOrder.xsd'stored object relationally;

Dbms_renametable('/purchaseOrder/lineItem', 'itemTab');
DDL to create indexes, along with comments to indicate why the advisor logic 110 suggest the particular indexes for creation:

Create Index itemPrice on itemTab.itemPrice; -- due to /purchaseOrder/lineItems[lineItem/price>3 and lineItem/Quantity>4]

Create Index itemQuantity on itemTab.itemQuantity; -- due to /purchaseOrder/lineItems[lineItem/price>3 and lineItem/Quantity>4]

Example B

In example B, the user has not specified an XML schema associated with the XMLType. Furthermore, the XPath query is more adequately satisfied by an XML index. The advisor logic 110 includes BSC code 122 in the script 120 to create binary XML storage. Furthermore, the advisor logic 110 includes IC code 124 to create an XML index. Also, because user query using existsNode( ) to search for lineItem/price and lineItem/Quantity together, the advisor logic 110 includes a suggestion to create an XMLTable Index.

The user specifies the following SQL scripts:
DDL to create XMLType table without any storage specification or schema Create table purchaseOrder of XMLType;
Sample Queries

```
Select extract(value(po), '/purchaseOrder/lineItems', 'xmlns="
http://www.example.com/purchaseOrder.xsd"')
From purchaseOrder po
Where existsNode(value(po), '/purchaseOrder/lineItems[lineItem/price > 3
and lineItem/Quantity > 4]',
'xmlns=" http://www.example.com/purchaseOrder.xsd"') =1;
        Select extract(value(po), '//lineItems')
From purchaseOrder po
;
        Select extract(value(po), '//lineItems[//price = 3]')
From purchaseOrder po
;
```

The advisor logic 110 generates the following SQL DDL scripts:
Create table purchaseOrder of XMLType'stored binaryXML;

Create index pidx on value(po) type XMLIndex;

Create index ptabidx on value(po) type XMLTableIndex
(XMLTable xmltabli '/purchaseOrder/lineItems'
COLUMNS lineItemPrice number 'lineItem/price', lineItemQuantity number 'lineItem/Quanity');

Create index on xmltabli(lineItemPrice, lineItemQuantity);

Hardware Overview

Figure 4:
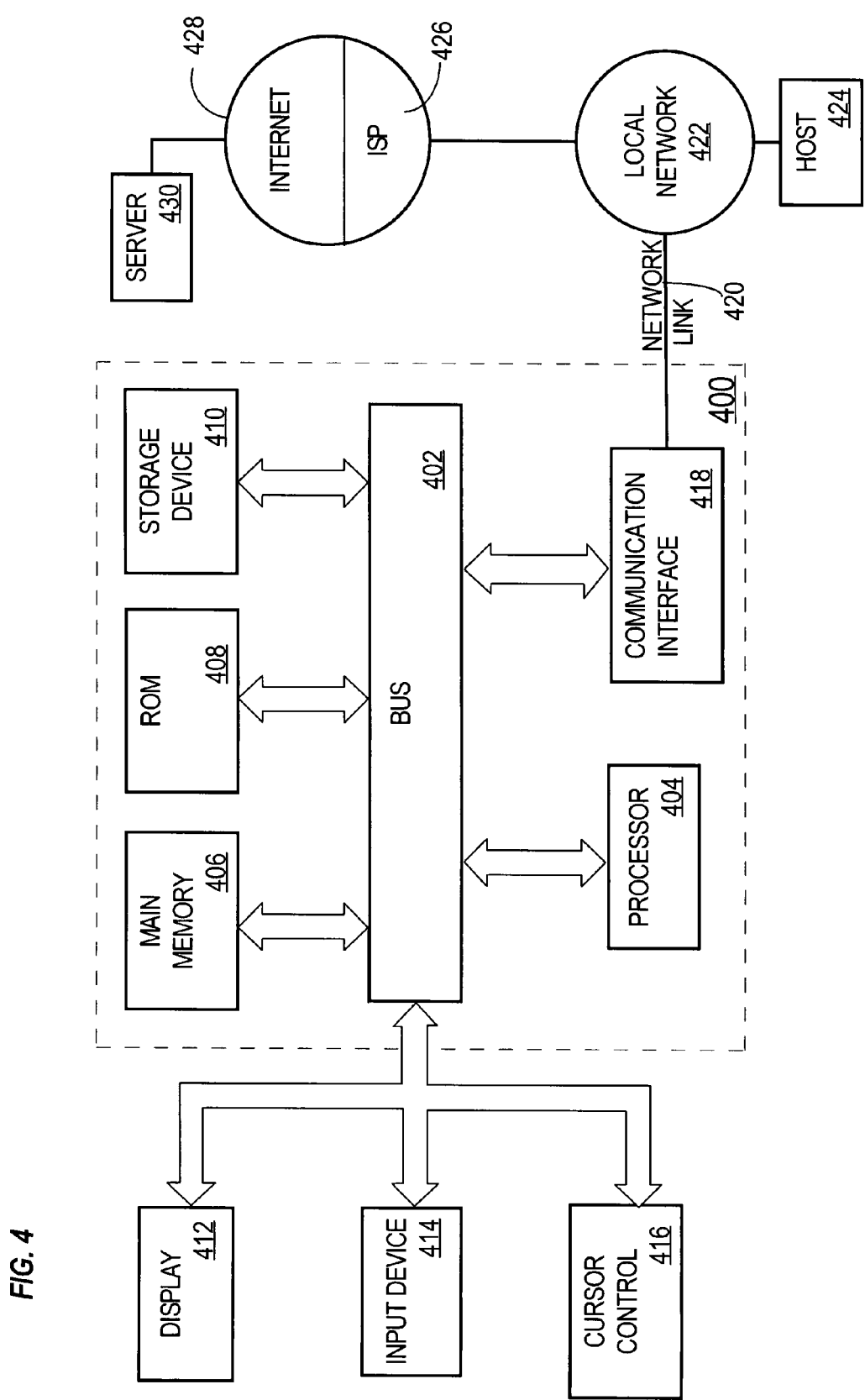
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving a logical description that references an abstract datatype in a database system, wherein the database system supports multiple database representations for the abstract datatype;
   receiving one or more sample queries that reference the abstract datatype;
   evaluating the one or more sample queries, wherein evaluating one or more sample queries comprises:
      determining a plurality of database representations that the database system supports for the abstract datatype;
      re-writing the one or more sample queries based on the plurality of database representations;
      performing a cost analysis of the re-written sample queries;
   based on the logical description and said evaluating said one or more sample queries, determining a database representation for the abstract datatype;
   wherein said database representation includes one or more base structures that are used to store data for the abstract datatype;
   wherein the method is performed by one or more computing devices.

2. The method of claim 1, further including the step of: based on determining a database representation for the abstract datatype, generating a code to execute to create the database representation for the abstract datatype.

3. The method of claim 2, further comprising:
   generating comments for the code, wherein the comments include a reason why the database representation was determined.

4. The method of claim 1, further including the step of: based on determining a database representation for the abstract datatype generating a code to execute to create one or more base structures for the abstract datatype.

5. The method of claim 4, further including the step of: based on determining a database representation for the abstract datatype, generating a code to execute to create one or more indexes for the one or more base structures for the abstract datatype.

6. The method of claim 4,
   wherein the database system supports rewriting queries that reference the abstract datatype to instead reference the one or more base structures.

7. The method of claim 6,
   wherein the database representation includes one or more indexes for the base structures; and
   wherein the database system supports rewriting queries that reference the abstract datatype to instead reference the one or more indexes.

8. The method of claim 1, further including the step of: based on the cost analysis, outputting a cost of one or more of the re-written queries.

9. The method of claim 1, wherein determining the database representation for the abstract datatype is further based on a schema for the abstract datatype.

10. A method comprising:
  receiving a logical description that references an XML datatype, wherein a database system supports multiple database representations for the XML datatype;
  receiving one or more Data Manipulation Language (DML) queries that reference the XML datatype;
  evaluating the one or more DML queries, wherein evaluating one or more DML queries comprises:
    determining a plurality of database representations that the database system supports for the XML datatype;
    re-writing the one or more DML queries based on the plurality of database representations;
    performing a cost analysis of the re-written DML queries;
  based on the logical description and said evaluating said one or more DML queries, determining a database representation for the XML datatype;
  wherein said database representation includes one or more base structures that are used to store data for the XML datatype;
  wherein the methodis performed by one or more computing devices.

11. The method of claim 10, further including the step of:
  based on determining a database representation for the XML datatype, generating Data Description Language (DDL) code to execute to create one or more base structures for the XML datatype.

12. The method of claim 11, further including the step of:
  based on determining a database representation for the XML datatype, generating Data Description Language (DDL) code to execute to create one or more indexes for the one or more base structures.

13. The method of claim 12, further comprising:
  generating comments for the DDL code to execute to create one or more indexes for the base structures, wherein the comments include a reason why the database representation was determined.

14. The method of claim 10,
  wherein the database system supports rewriting DML queries that reference the datatype to instead reference the one or more base structures.

15. The method of claim 14,
  wherein the database representation includes one or more indexes for the base structures; and
  wherein the database system supports rewriting queries that reference the XML datatype to instead reference the one or more indexes.

16. The method of claim 10, further including the step of:
  based on the cost analysis, outputting a cost of one or more of the re-written queries.

17. The method of claim 10, wherein determining the database representation for the XML datatype is further based on a schema for the datatype.

18. A computer readable storage medium comprising instructions which, when executed by one or more processors, cause the one of more processors to perform:
  receiving a logical description that references an abstract datatype in a database system, wherein the database system supports multiple database representations for the abstract datatype;
  receiving one or more sample queries that reference the abstract datatype;
  evaluating the one or more sample queries, wherein evaluating one or more sample queries comprises:
    determining a plurality of database representations that the database system supports for the abstract datatype;
    re-writing the one or more sample queries based on the plurality of database representations;
    performing a cost analysis of the re-written sample queries;
  based on the logical description and said evaluating said one or more sample queries, determining a database representation for the abstract datatype;
  wherein said database representation includes one or more base structures that are used to store data for the abstract datatype.

19. The computer readable storage medium of claim 18, further including instructions for performing:
  based on determining a database representation for the abstract datatype, generating a code to execute to create the database representation for the abstract datatype.

20. The computer readable storage medium of claim 19, further comprising instructions for performing:
  generating comments for the code, wherein the comments include a reason why the database representation was determined.

21. The computer readable storage medium of claim 18, further including instructions for performing:
  based on determining a database representation for the abstract datatype generating a code to execute to create one or more base structures for the abstract datatype.

22. The computer readable storage medium of claim 21, further including instructions for performing:
  based on determining a database representation for the abstract datatype, generating a code to execute to create one or more indexes for the one or more base structures for the abstract datatype.

23. The computer readable storage medium of claim 21,
  wherein the database system supports rewriting queries that reference the abstract datatype to instead reference the one or more base structures.

24. The computer readable storage medium of claim 23,
  wherein the database representation includes one or more indexes for the base structures; and
  wherein the database system supports rewriting queries that reference the abstract datatype to instead reference the one or more indexes.

25. The computer readable storage medium of claim 18, further including instructions for performing:
  based on the cost analysis, outputting a cost of one or more of the re-written queries.

26. The computer readable storage medium of claim 18, wherein determining the database representation for the abstract datatype is further based on a schema for the abstract datatype.

27. A computer readable storage medium comprising instructions which, when executed by one or more processors, cause the one of more processors to perform:
  receiving a logical description that references an XML datatype, wherein a database system supports multiple database representations for the XML datatype;
  receiving one or more Data Manipulation Language (DML) queries that reference the XML datatype;
  evaluating the one or more DML queries, wherein evaluating one or more DML queries comprises:
    determining a plurality of database representations that the database system supports for the XML datatype;
    re-writing the one or more DML queries based on the plurality of database representations;
    performing a cost analysis of the re-written DML queries;

based on the logical description and said evaluating said one or more DML queries, determining a database representation for the XML datatype;

wherein said database representation includes one or more base structures that are used to store data for the XML datatype.

28. The computer readable storage medium of claim 27, further including instructions for performing:

based on determining a database representation for the XML datatype, generating Data Description Language (DDL) code to execute to create one or more base structures for the XML datatype.

29. The computer readable storage medium of claim 28, further including instructions for performing:

based on determining a database representation for the XML datatype, generating Data Description Language (DDL) code to execute to create one or more indexes for the one or more base structures.

30. The computer readable storage medium of claim 29, further comprising instructions for performing:

generating comments for the DDL code to execute to create one or more indexes for the base structures, wherein the comments include a reason why the database representation was determined.

31. The computer readable storage medium of claim 27, wherein the database system supports rewriting DML queries that reference the datatype to instead reference the one or more base structures.

32. The computer readable storage medium of claim 31, wherein the database representation includes one or more indexes for the base structures; and wherein the database system supports rewriting queries that reference the XML datatype to instead reference the one or more indexes.

33. The computer readable storage medium of claim 27, further including instructions for performing:

based on the cost analysis, outputting a cost of one or more of the re-written queries.

34. The computer readable storage medium of claim 27, wherein determining the database representation for the XML datatype is further based on a schema for the datatype.

* * * * *

UNITED STATES PATENT AND TRADEMARK OFFICE
CERTIFICATE OF CORRECTION

| | |
|---|---|
| PATENT NO. | : 7,860,899 B2 |
| APPLICATION NO. | : 11/728650 |
| DATED | : December 28, 2010 |
| INVENTOR(S) | : Zhen Hua Liu |

It is certified that error appears in the above-identified patent and that said Letters Patent is hereby corrected as shown below:

On the title page, item (56), in column 2, under "Other Publications", line 2, delete "Comupter" and insert -- Computer --, therefor.

In column 1, line 55, delete "(extensible" and insert -- (eXtensible --, therefor.

In column 8, line 57, delete "ineItemQuantity" and insert -- lineItemQuantity --, therefor.

In column 8, line 60, delete "MLTable" and insert -- XMLTable --, therefor.

In column 8, line 60, delete "alue(po)" and insert -- value(po) --, therefor.

In column 13, line 21, in claim 10, delete "methodis" and insert -- method is --, therefor.

Signed and Sealed this
Thirteenth Day of September, 2011

David J. Kappos
*Director of the United States Patent and Trademark Office*